Nov. 11, 1924.

E. J. HAMILTON

TONGS

Filed July 3, 1923

1,515,038

WITNESSES

INVENTOR
Edward J. Hamilton
BY
ATTORNEYS

Patented Nov. 11, 1924.

1,515,038

UNITED STATES PATENT OFFICE.

EDWARD JOSEPH HAMILTON, OF BALTIMORE, MARYLAND.

TONGS.

Application filed July 3, 1923. Serial No. 649,294.

*To all whom it may concern:*

Be it known that I, EDWARD J. HAMILTON, a citizen of the United States, residing in the city of Baltimore, State of Maryland, have invented certain new and useful Improvements in Tongs, of which the following is a specification.

This invention relates to improvements in tongs.

The invention more particularly relates to tongs which may be employed for lifting hot pans or vessels.

The object of the invention is to provide a pair of prongs of the above character whereby a vessel or pan may be grasped in an efficient manner and easily lifted.

It is also an object of the invention that the tongs be adapted to grasp a vessel or pan of any shape.

It is also within the scope of the objects of the invention that the tongs be exceedingly simple in construction and inexpensive to manufacture.

The invention is illustrated by way of example in the accompanying drawing, in which.

Figure 1:
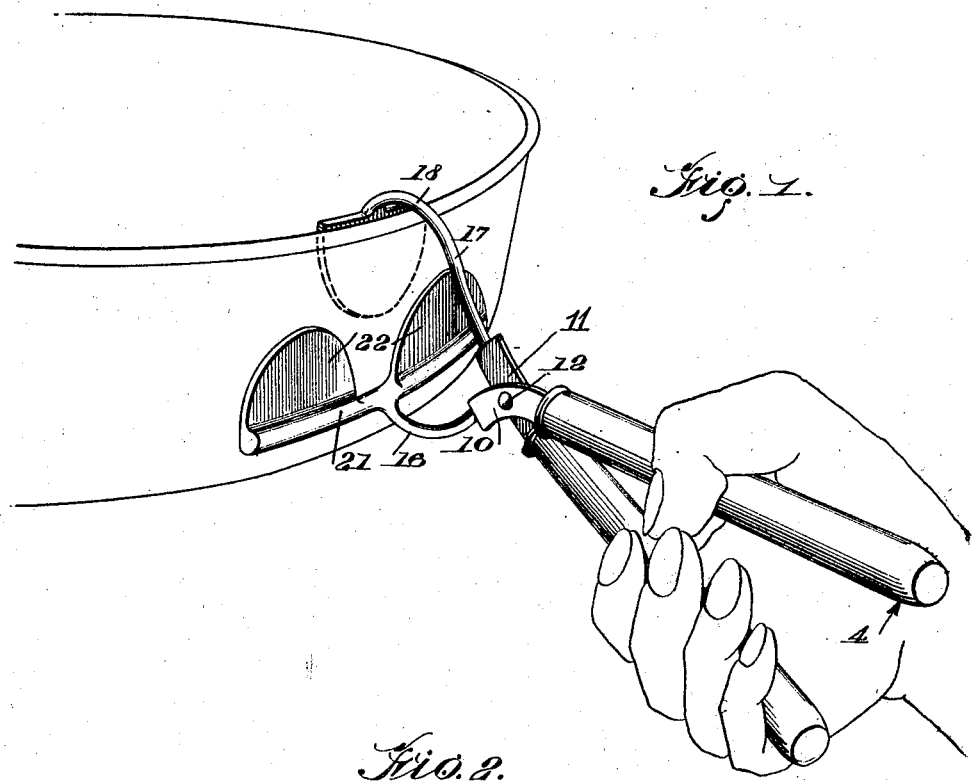
Figure 1 is perspective view showing the application of the invention.

Referring to the drawings more particularly, the device may comprise a pair of shank or body members 10 and 11, each being arcuate longitudinally and of plate-like formation. These shank members are pivotally connected to each other by means of a pin or rivet as indicated at 12. Each member is formed at its one end with an elongated pointed extension 13 which may carry a handle 4. Also a suitable washer or ring 15 may be interposed between each handle and the associated shank member.

The shank members 10 and 11 are formed with the extensions 16 and 17, respectively. Each extension 16 and 17 is bent inwardly, as at 18. The extension 17 terminates at its outer end in an inwardly extending plate member 19. This plate member 19 is substantially semi-circular in shape and is bent to provide an inner concave surface 20.

Figure 2:
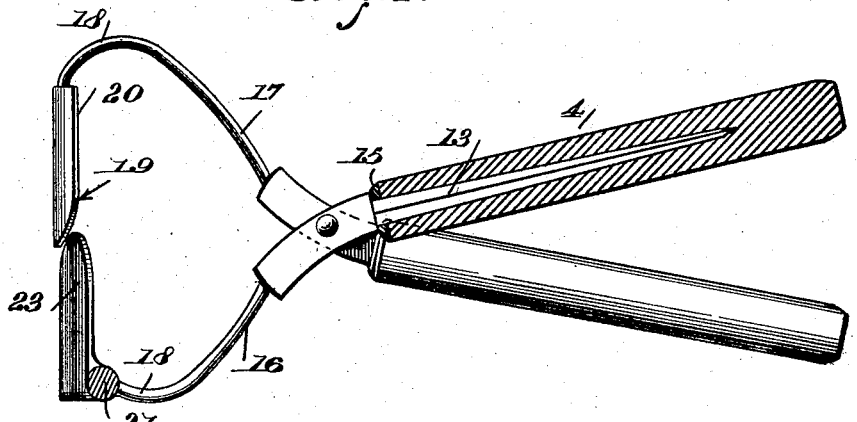
Figure 2 is a view in side elevation and partly in section of the device.

The extension 16 terminates at its outer end in a cross member 21 which is formed with a pair of plate members 22. The plate members 22 are also substantially semi-circular in shape and each plate member is bent or curved to provide an exterior concaved surface, as at 23, Fig. 2.

In the use of the present device as illustrated to advantage in Figure 1, the same may be applied to a circular pan for lifting said pan. As shown in this figure the plate 19 is positioned upon the inner side of the upstanding portion of the pan, while the plates 22 are positioned upon the outside of said portion of the pan. By exerting pressure to move the handles 4 toward each other, the pan will be grasped between the jaws of the device, that is, the jaws constituting the plates 19 and 22 together with the extensions 17 and 16, respectively, carrying said plates.

It is also clearly apparent that by providing the convexed faces or sides of the plates 19 and 22 the same will be adapted to be applied to the side walls of a pan or vessel of any shape. With a device of this character a heated pan or vessel may be lifted without danger of burning the operator's fingers. Also the device may be used for withdrawing a heated pan from an oven or other heated enclosure.

While I have shown and described the preferred form of my invention, I wish it to be understood that I am aware of the fact that the construction, combination and arrangement of parts may be changed by those skilled in the art without departing from the spirit of the invention, as indicated by the appended claims.

I claim:

1. In a tong construction of the character described, a pair of jaw members, each jaw being in the form of an inturned hook shaped member, one of which is disposed in advance of the other, a cross-head formed upon the inner end of one jaw and terminating at each end in a plate, and a plate upon the inner end of the other jaw, said plates carried by the jaws each being arcuate in cross-section and the concave face of the forward jaw in opposing relation to the similar faces of the plates carried by the other jaw.

2. A device of the character described, comprising a pair of handles pivotally connected adjacent similar ends, and the last named end of each handle terminating in a curved extension, said extensions being disposed in opposing relation, an inwardly extending terminal plate formed upon the free end of one extension, a cross rod formed upon the free end of the other extension, said cross rod being arcuate longitudinally, and an inwardly extending plate formed adjacent each end of the cross rod.

EDWARD JOSEPH HAMILTON.